(12) United States Patent
Nagahama et al.

(10) Patent No.: US 7,743,914 B2
(45) Date of Patent: Jun. 29, 2010

(54) DUST TIGHT CLOSED TYPE BELT CONVEYOR

(75) Inventors: Hideharu Nagahama, Himeji (JP); Shogo Nagahama, Himeji (JP); Akira Nagahama, Himeji (JP); Masakazu Tsukamoto, Kure (JP); Koji Fujioka, Kure (JP)

(73) Assignee: Yoko Inc., Himeji-shi (JP)

( * ) Notice: Subject to any disclaimer, the term of this patent is extended or adjusted under 35 U.S.C. 154(b) by 13 days.

(21) Appl. No.: 12/171,877

(22) Filed: Jul. 11, 2008

(65) Prior Publication Data

US 2010/0006403 A1    Jan. 14, 2010

(51) Int. Cl.
*B65G 21/10* (2006.01)

(52) U.S. Cl. ............ 198/860.3; 198/818; 198/820

(58) Field of Classification Search ......... 198/818–830, 198/860.3
See application file for complete search history.

(56) References Cited

U.S. PATENT DOCUMENTS

| 3,809,211 A | * | 5/1974 | Padilla | 198/825 |
|---|---|---|---|---|
| 4,359,156 A | * | 11/1982 | Austin | 198/823 |
| 5,129,508 A | * | 7/1992 | Shelstad | 198/860.3 |
| 6,269,943 B1 | * | 8/2001 | Mott | 198/823 |
| 2002/0063041 A1 | * | 5/2002 | Fischer et al. | 198/820 |
| 2005/0040017 A1 | * | 2/2005 | Kinnunen et al. | 198/825 |
| 2005/0178643 A1 | * | 8/2005 | Simoens et al. | 198/823 |

FOREIGN PATENT DOCUMENTS

| JP | 2-94829 U | 7/1990 |
|---|---|---|
| JP | 4-47149 Y | 11/1992 |
| JP | 9-142665 A | 6/1997 |
| JP | 2002-019940 A | 1/2002 |

* cited by examiner

*Primary Examiner*—James R Bidwell
(74) *Attorney, Agent, or Firm*—Smith Patent Office

(57) ABSTRACT

A dust tight closed type belt conveyor for conveying dust contained materials to be scattered out during operation; which comprises the conveyor belt supported in a form of concave by a plurality of rollers and a plurality of glide plates and also the bulged cover roof closing the upside space over the conveyor belt, so that all make a dust tight and closed conveying space extending in the driving direction. Further, the belt conveyor is preferably provided with a system for avoiding the belt meandering motion causing a harder dust scattering.

6 Claims, 7 Drawing Sheets

DUST TIGHT CLOSED TYPE BELT CONVEYOR

BACKGROUND OF THE INVENTION

1. Field of the Invention

The present invention relates to a dust tight closed type belt conveyor, and more particularly, to a belt conveyor provided with a cover roof closing an upside space over the conveyor belt which is an easily lay-out system in a narrow space as well as no meandering system for avoiding dust scattering.

2. Discussion of the Related Art

Currently, it is generally understood that a belt conveyor is the lowest cost one in the transport mechanism and a number of conveyors have been used in various kinds of factories. However, when materials to be transported sometimes comprise powders or dust-like powders, the powders are easily scattered out to an outside from the conveyor, which may results in degradation of the environment.

Thus, the belt conveyer needs a device or system for avoiding dust scattering. Therefore, a carrier part and a return part of a belt conveyor and a transfer section are partially covered with a cover (Japanese Utility Model Publication No. 02-94829, No. 04-47149 and Japanese Patent Publication No. 2002-19940).

In addition, sometimes a rectangle-shaped cover is placed on a flat carrier belt of a conveyor to form a closed passage and a chute is coupled with a cover (Japanese Patent Application Publication No. 09-142665).

SUMMARY OF THE INVENTION

However, in case of the belt conveyor described in the above, it is necessary to arrange large-sized covers so as to cover a carrier side space and a return side space, so that a large layout space is required and sometimes the cover cannot be applied because of insufficient space in the periphery of the belt conveyor.

Further, in a case of the belt conveyor described in the last case, a cover size is relatively small and arrangement is not limited by the layout of the conveyor. However, the cover is placed on the flat carrier belt, so that there is a gap between the cover and the carrier belt and thus dust may be scattered out for cause of the belt meandering.

In consideration of the above-mentioned problems regarding the invention, a first object of the present invention is to provide a closed belt conveyor arranged in a dust tight manner which can be easily laid out even in a narrow space. Further, a second object of the present invention is to provide a closed belt conveyor provided with a system for avoiding the belt meandering which causes a harder dust scattering.

According to a first aspect of this invention, there is provided a dust tight closed type belt conveyor for conveying dust contained materials to be scattered out during operation; which comprises:

1) an endless conveyor belt to be driven for receiving and conveying the materials, being laid out from an upstream side provided with a transfer section from a chute to a downstream side, 2) a supporting frame for supporting the conveyor belt from the backside thereof comprising a plurality of rollers arranged at regular intervals in a driving direction for supporting a main backside part of the conveyor belt in a concave form and glide plates arranged between the rollers in the driving direction for supporting both edges of the conveyor belt from the backside thereof, 3) a cover roof extending in the driving direction for dust tightly closing an upside space of the conveyor belt extending in the driving direction comprising top plates pitched so as to spread over from one of the glide plates through the upside space of the conveyor belt to the other of the glide plates, whereby the conveyor belt supported in a form of concave by a plurality of rollers, a plurality of the glide plates contacted by the both edges of the conveyor belt and the cover roof closing the upside space over the conveyor belt all make a dust tight and closed conveying space extending in the driving direction.

In a preferred embodiment of this invention, the left and right side glide plates are upwardly inclined in the outside direction and provided in the conveyor frame, the cover roof comprises first and second top plates attached to cover the carrier belt at the transfer section and the downstream thereof, and the closed-section space is formed by the glide plates, the carrier belt, and the first and second top plates. With such a configuration, it is possible to prevent the dust from being scattered to outside and the installation is not limited due to the layout space.

In another preferred embodiment of the invention, the carrier belt is bent in the concave shape by the left and right glide plates. With such a configuration, the conveying object is stably mounted on the center of the carrier belt. In addition, since the tension is applied to the carrier belt so as to be pressed inward in the width direction, meandering of the carrier belt can be reduced and suppressed.

In a further preferred embodiment, each supporting roller comprises horizontal center roller and a pair of half-length side slope rollers arranged at both sides of the center roller and upwardly inclined in the outside direction and each glide plates is arranged at both sides of the conveyor belt and upwardly inclined in the outside direction with a larger oblique angle than that of side slope roller so as to make the edges of the conveyor belt bent inside for preventing meandering motion of the conveyor belt.

Since the transfer section and the downstream section thereof are constructed in a manner of different structures, a structure for preventing the dust from being scattered from the boundary portion is required. Thus, when the end portion of the first top plate of the transfer section is allowed to overlap with the lower portion of the start portion of the second top plate on the downstream side of the transfer section, for example, by the length in the range of 30 cm to 80 cm, the dust is pulled to the downstream side due to the airflow by travelling of the carrier belt in spite of the fact that there is a gap between the first and second top plates.

According to another aspect of the invention, the first and second top plates are attached by using the conveyor frame. With such a configuration, since the structure of the invention may be simply applied to the conveyor provided in advance, the practical value thereof is great. The first and second top plates may be attached to the conveyor frame, for example, by bolts, nuts, welding, or the like. Alternatively, when a cup-shaped attachment bracket is fixed to the conveyor frame and the outer end portion of the first top plate and the left and right end portions of the second top plate are fitted into the attachment bracket, the first and second top plates can be attached to the conveyor frame by a simple work. Further, when such an attachment bracket is used, the first and second top plates can be simply detached even in case of an exchange of the first and second top plates for any reason. Accordingly, the exchange work can be simply performed.

When the first top plate is attached to cover the space between the skirt plate of the chute and the conveyor frame, the first top plate may be attached in any structure. For example, a fitting groove may be formed at the center of the first top plate, the first top plate may be curved in an arc shape at the time of attaching the first top plate to the conveyor frame, and the inner edge portion of the fitting groove may be closely pressed and attached to the skirt plate of the chute.

A fitting groove may be formed at the center of the first top plate, the first top plate flatly extends inward at the time of attaching the first top plate to the conveyor frame, a flexible curtain and a dustproof member may be fixed to the inner edge of the first top plate, the curtain is suspended and curved inward in a width direction, the lower portion of the curtain comes in slidable contact with the carrier belt, and the dustproof member may be closely attached to the outer surface of the skirt plate of the chute.

As the dustproof member and the contact member may be made of synthetic resin foam such as urethane foam or a sponge such as a foaming rubber. However, in consideration of the usage circumference of the conveyor belt, it is preferable to use a soft sponge formed of polyethylene based foam having excellent weather resistance, chemical resistance, durability, chemical resistance, and wear resistance.

The entire of the dustproof member or the contact member may be formed of the soft sponge. However, in consideration of vibrations or impacts to the dustproof member or the contact member, the dustproof member or the contact member may be formed to insert a center member into the soft sponge. The center member may be formed of any material if the center material has elasticity, and the center member is preferably formed of a synthetic resin in consideration of the cost thereof.

The glide plate may be formed of any material if the carrier belt can come in contact with the glide plate so as to be easily slid. For example, a polyethylene resin with high molecular weight may be used. In addition, the curtain may have flexibility and prevent the dust from being scattered. For example, rubber or soft synthetic resin material may be used.

In the transfer section, it is preferable that the carrier belt smoothly bent in the concave shape and then vertical rollers are obliquely provided on the upstream side thereof. That is, it is preferable that slope rollers are provided in the left and the right of the upstream side of the transfer section and the portion of the carrier belt coming out from the transfer section is bent in a concave shape.

Further, it is preferable that a plurality of horizontal rollers for receiving the carrier belt are provided in the center in the width direction of the conveyor frame through the whole length in the longitudinal direction thereof with intervals. Particularly, in order to avoid the carrier belt fluctuating up and down due to the impact at the time of receiving the conveying object from the chute, it is preferable that the horizontal rollers are provided with short intervals.

DETAILED DESCRIPTION OF THE PREFERRED EMBODIMENT

Figure 1:
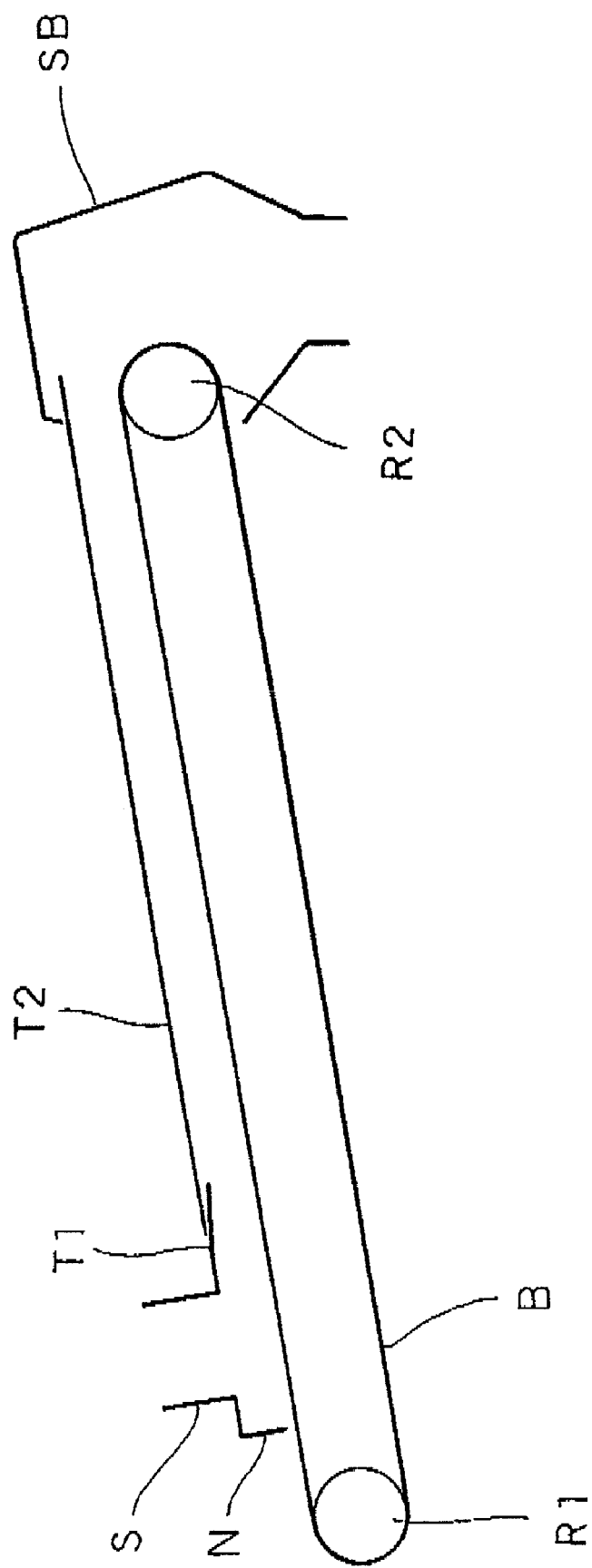
FIG. 1 is a schematic constituent diagram illustrating a preferred embodiment of a closed type belt conveyor according to the invention.

Hereinafter, the invention will be described in detail with reference to detailed examples shown in the drawings. FIGS. 1 to 5 show preferred embodiments of the closed type belt conveyor according to the invention. The closed type belt conveyor according to the embodiment has the same structure as that of a schematic diagram shown in FIG. 1. That is, a conveyor belt B is suspended in an endless shape between rollers R1 and R2 at both front and rear ends thereof and any one of the rollers R1 and R2 is driven by a driving motor (not shown), thereby traveling the conveyor belt B in the endless shape.

A transfer section A is provided in a travel start portion of carrier belt B. In the transfer section A, a conveying object from a chute S is received to the carrier belt B to be conveyed to the downstream side. A curtain N made of rubber or soft synthetic resin for prevent dust from be scattered is provided in the start portion of the transfer section A and the lower end of the curtain N comes in contact with the carrier belt B so as to be slid or appropriates the carrier belt B. The upper portion of the carrier belt B is covered with first and second top plates T1 and T2 and the end portion of the second top plate T2 is inserted into a chute box SB of the belt conveyor.

Next, the detailed structure of the embodiment will be described with reference to FIGS. 2 to 5. In FIGS. 2 to 5, a conveyor frame 10 is constituted by a mount frame 11, a brace 12 mounted on the mount frame 11, and a carrier stand 13. A driving roller and a driven roller (not shown) are rotatably supported at both front and rear ends of the conveyor frame 10.

Figure 2:
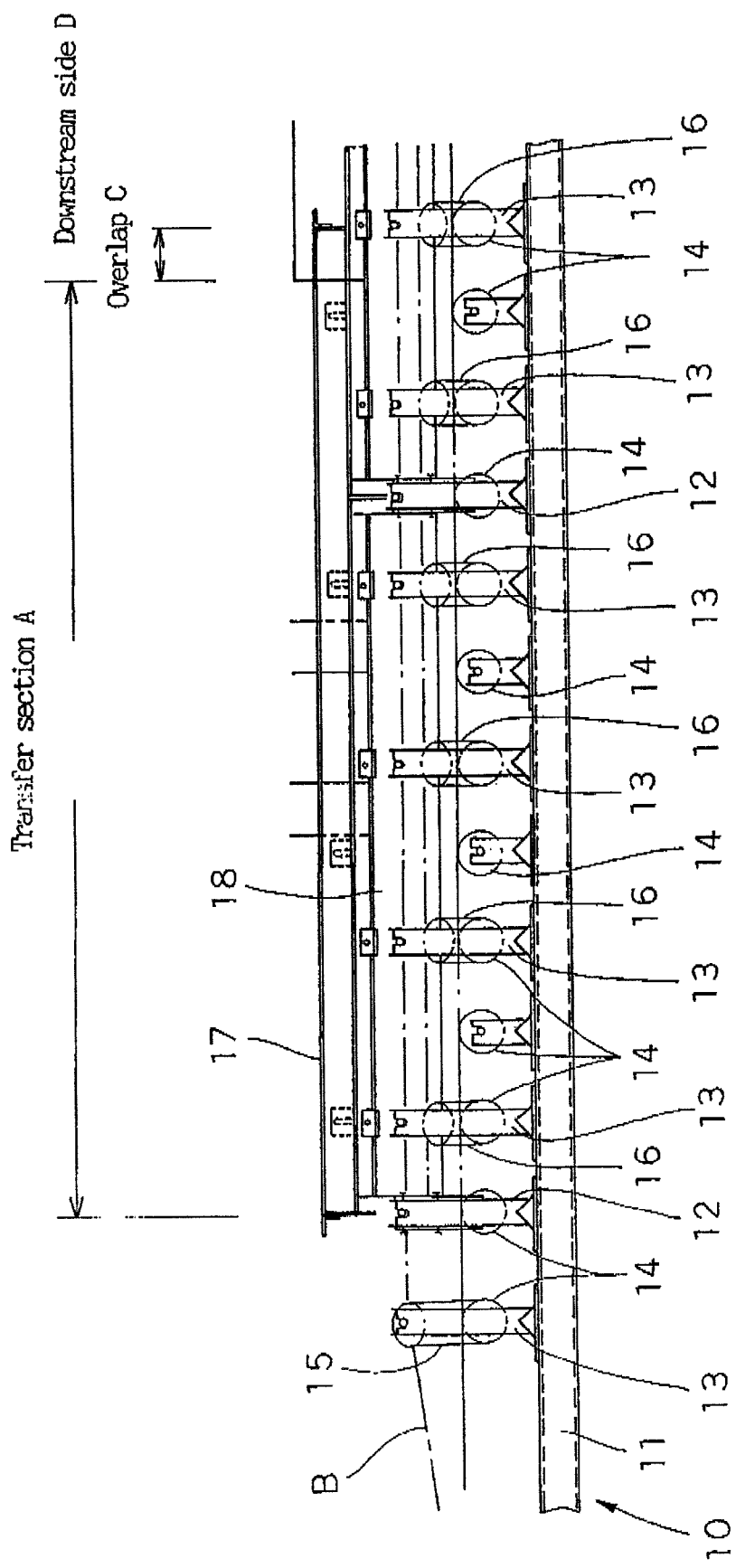
FIG. 2 is a constituent diagram illustrating a structure of a transfer section A and a direct downstream side thereof in the embodiment.
Figure 3:
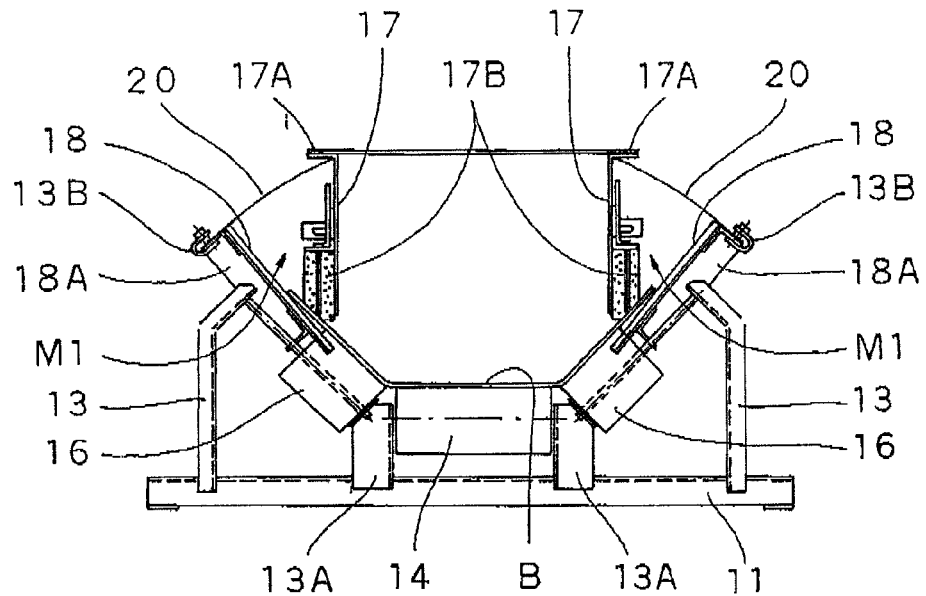
FIG. 3 is a constituent diagram illustrating a structure of a transfer section A in the embodiment.
Figure 4:
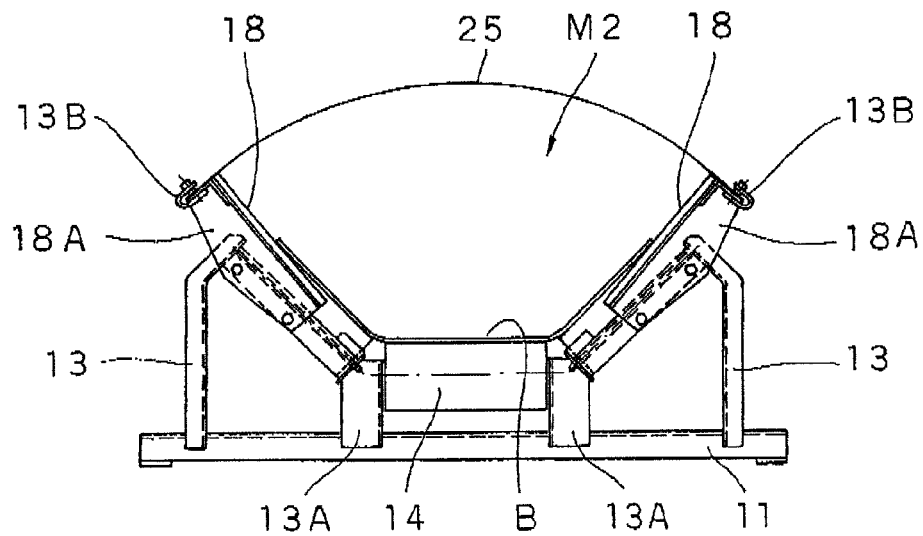
FIG. 4 is a constituent diagram illustrating a structure of a downstream side of a transfer section A in the embodiment.
Figure 5:
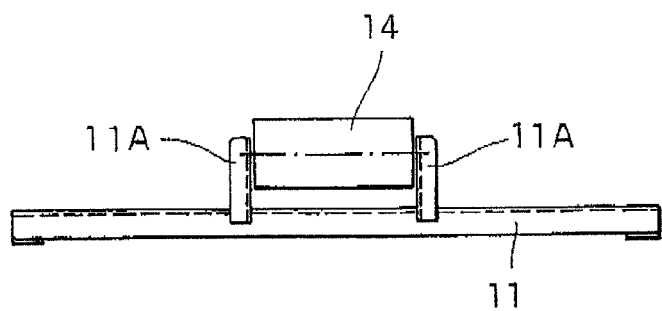
FIG. 5 is a constituent diagram illustrating a structure of a horizontal roller 14 of a transfer section A in the embodiment.
Figure 6:
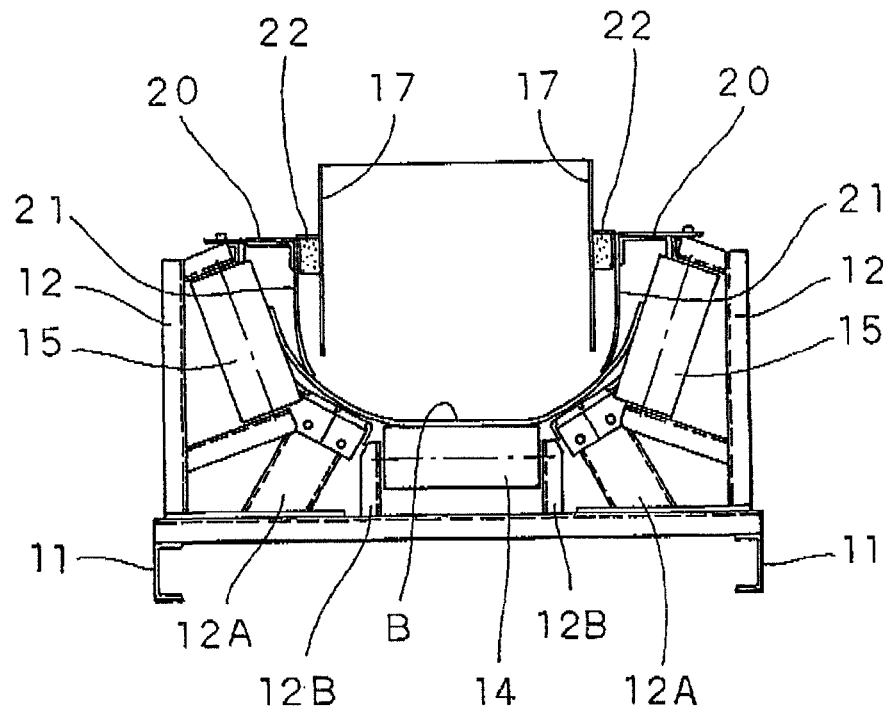
FIG. 6 is a constituent diagram illustrating a structure of an upstream side of a transfer section A in a second embodiment.
Figure 7:
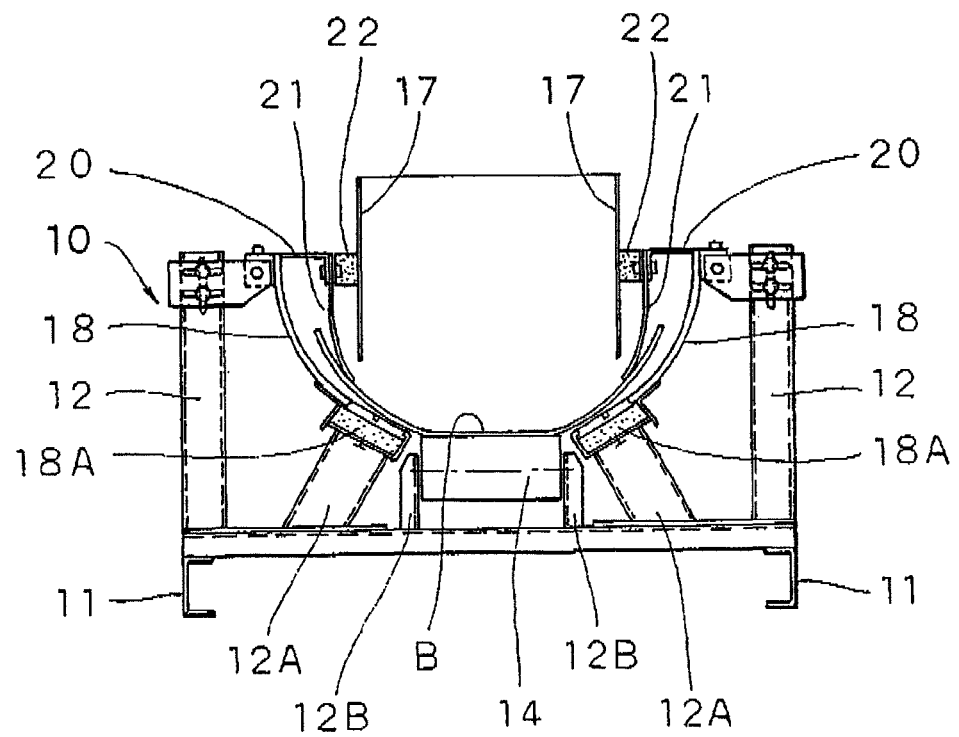
FIG. 7 is a constituent diagram illustrating a structure of a transfer section A in the embodiment.

As shown in FIG. 2, a plurality of horizontal rollers 14 are disposed at the center of the conveyor frame 10 under the carrier belt B in the width direction through the whole length in the longitudinal direction with predetermined intervals and are rotatably supported between the left and right supporters 11A and 13A fixed to the mount frame 11.

The transfer section A is provided on the upstream side of the belt conveyor close to the carrier. In the transfer section A, skirt plates 17 at the left and right of the chute are disposed to extend in the longitudinal direction with intervals therebetween and are attached to the brace 12 of the conveyor frame 10. In the transfer section.

A, the intervals of the above-described horizontal rollers 14 are set to be smaller than those of the horizontal rollers 14 on the downstream side of the transfer section A and it is avoided that the carrier belt B waves due to the impact at the time of receiving the conveying object dropped from the chute.

Vertical rollers 15 are provided in both left and right sides of the start portion of the transfer section A, for example, at 45- from the vertical line, the vertical rollers 15 is rotatably supported between the carrier stand 13 and the supporter 13A, and the vertical rollers 15 bend the carrier belt B in a concave shape so as to send the carrier belt B to the transfer section A.

A glide plate 18 made of polyethylene with high molecular weight is obliquely provided to extend at the substantially whole length in the longitudinal direction from the transfer section A to the carrier end portion. The glide plate 18 is supported to the carrier stand 13 with a reception bracket 18A interposed therebetween, comes in contact with both side portions of the carrier belt B having the concave portion so as to be slid, and sends the carrier belt B with the concave shape to the carrier end portion.

Slope rollers 16 which are shorter than the vertical rollers 15 are provided in the lower portion of the glide plate 18. The slope rollers 16 are rotatably supported between the carrier stand 13 and the supporter 13A and glide the movement of the carrier belt B by the left and right slope rollers 16 and the horizontal rollers 14.

In addition, a cup-shaped attachment bracket 13B is fixed to the upper end of the reception bracket 18A of the left and right carrier stands 13 by a welding or an attachment screw. In the transfer section A, the outer end portion of the first top plate 20 which is a zinc coating plate is fitted into the attachment bracket 13B and is fixed by the attachment screw. The first top plate 20 covers the space between the skirt plate 17 and the carrier stand 13. A closed-section space M1 is formed in both sides of the skirt plate 17 of the chute by the glide plate 18, the first top plate 20, and the carrier belt B.

In the first top plate 20, a fitting groove is formed in the center in the width direction and the skirt plate 17 of the chute is fitted into the fitting groove. The inner edge of the fitting groove of the first top plate 20 comes in contact with the curved portion 17A of the upper end of the skirt plate 17 and thus the first top plate 20 is bent in an arc shape, thereby not pulling out the first top plate 20.

A soft sponge cap 17B is attached to the skirt plate 17 by the attachment bracket, and the cap 17B is tightly pressed by both edge portions of the carrier belt B.

On the downstream side from the transfer section A, the outer end portion of the second top plate 25 which is the zinc coating plate is fitted to the left and right attachment brackets 13B and fixed by the attachment screw. The second top plate 25 is curved in the arc shape and covers the upper portions of the carrier belt B and the glide plate 18. In addition, a closed-section space M2 is formed in the upper portion of the carrier belt by the glide plate 18, the second top plate 25, and the carrier belt B.

In the direct downstream side of the transfer section A, the end portion of the first top plate 20 overlaps with and is inserted to the lower portion of the start portion of the second top plate 25 and, for example, by about 50 cm.

When the conveying object is dropped from the chute, the conveying object is received to the carrier belt B in the transfer section A and conveyed to the downstream side by the carrier belt B.

At that time, the power-shaped object contained in the conveying object becomes dust and flies in the transfer section A and the downstream side D thereof. In the transfer section A, the closed-section space M1 is formed by the skirt plate 17, the first top plate 20, and the glide plate 18. Further, the gap in the transfer section A is practically closed. Accordingly, the dust is not scattered from the transfer section A to the circumference.

In addition, since the closed-section space M2 is formed on the downstream side D of the transfer section A by the carrier belt B, the second top plate 25, and the glide plate 19, the dust is not scattered from the downstream side D of the transfer section A to the circumference.

Further, in the boundary C between the transfer section A and the downstream side thereof, the first and second top plates 20 and 25 overlap with each other so that the former is the lower and the dust is pulled toward the downstream side D of the transfer section A by the airflow upon traveling the carrier belt B. Accordingly, the dust is not scattered from the boundary C between the first and second top plates 20 and 25.

As described above, the first and second top plates 20 and 25 are attached to the conveyor frame 10, the closed-section space M1 is formed in both sides of the skirt plate 17 of the chute in the transfer section A, and the closed-section space M2 for conveying the conveying object is formed. Accordingly, it is possible to reliably prevent the dust from being scattered to the circumference. Further, the belt conveyor has a compact size and thus there is no case where the installation is limited due to the layout space.

Since the carrier belt B is bent in the concave shape by the glide plate 18, the conveying object is stably mounted at the center of the carrier belt B. In addition, since tension is applied to the carrier belt B to be pressed inward in the width direction by the glide plate 18, the meander of the carrier belt B is reduced and suppressed.

On the downstream side D of the transfer section A, the slope roller 16 has the short size and only glide plate 18 is exposed in the side of the conveyor frame 10. Accordingly, a case where fingers of a worker are caught between the rollers at the time of checking the belt conveyor to damage the worker scarcely occurs.

FIGS. 6 to 9 show a second embodiment. In FIGS. 6 to 9, the same reference numerals as those in FIGS. 1 to 5 indicate the same or corresponding parts. In this embodiment, a first glide plate 18 is provided between the vertical rollers of the start portion and the end portion of the transfer section A so as to extend in the longitudinal direction of the first glide plate 18 in the sectional arc shapes in both left and right sides thereof, the upper end portion of the first glide plate 18 is attached to the brace 12, and the lower end portion of the first glide 18 is placed on the cushion such as a soft sponge on the supporter 12A and attached to absorb impacts or vibrations by the press of the attachment bracket.

The first glide plate 18 is manufactured, for example, by using a polyethylene resin with high molecular weight and sends the carrier belt B curved by the vertical roller 15 of the start portion to the downstream side D with the carrier belt B kept in the U shape.

Figure 8:
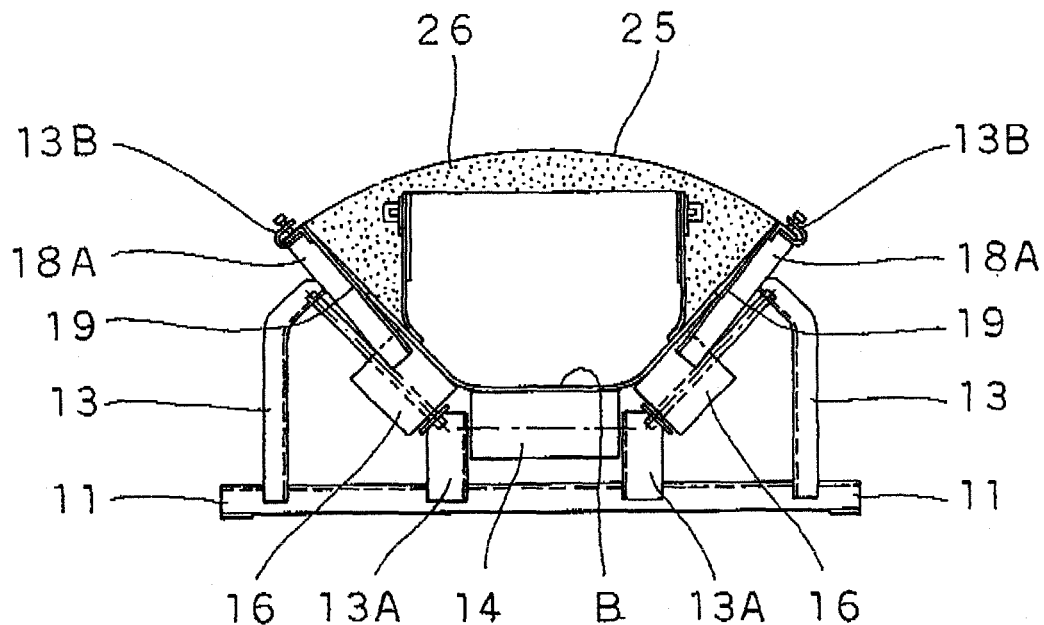
FIG. 8 is a constituent diagram illustrating a structure a boundary portion between a transfer section A and a downstream side in the embodiment.
Figure 9:
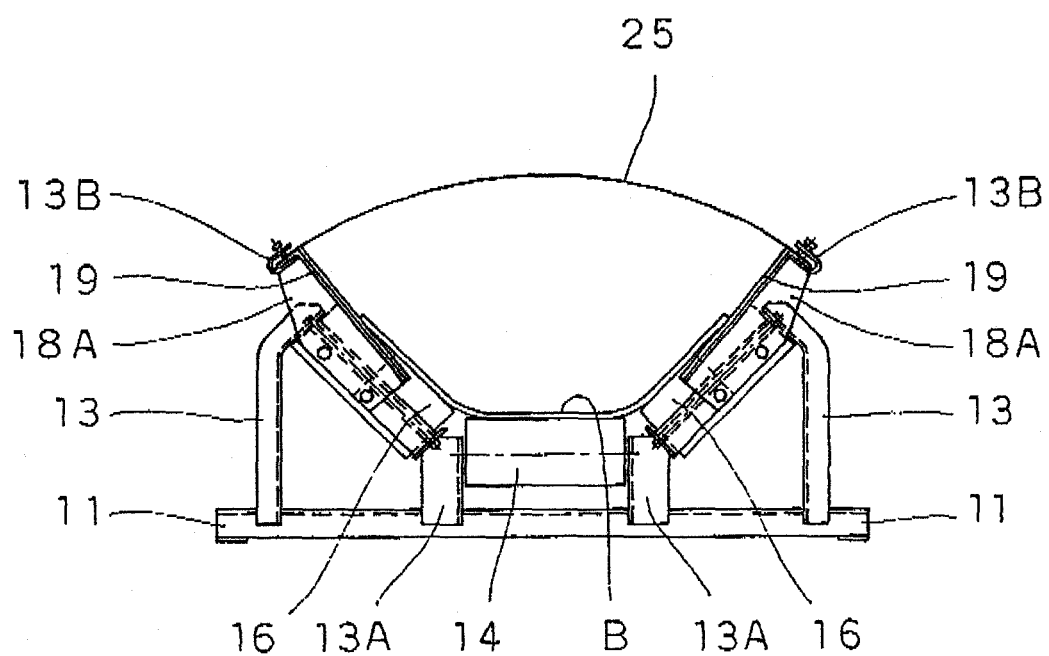
FIG. 9 is a constituent diagram illustrating a structure of a downstream side of a transfer section A in the embodiment.

On the downstream side D of the transfer section A, a flat (or sectional arc-shaped) second glide plate 19 is obliquely disposed in the upper portion of the slope roller 16 to extend through the whole length in the longitudinal direction, is received to the reception bracket 18A, and is attached to the carrier stand 13. The carrier belt B coming from the transfer section A is kept in the concave shape as shown in FIGS. 8 and 9.

In the transfer section A, the first top plate 20 having a narrow width extends inward and is fixed to the upper end of the carrier stand 13, a curtain 21 and the a dustproof member 22 are fixed to the inner end of the first top plate 20. The flexible curtain 21 is manufactured, for example, by using polyethylene resin with high molecular weight and extends through the whole length in the longitudinal direction of the transfer section A. Further, the lower portion of the curtain 21 is curved inward in the width direction and comes in contact with the carrier belt B so as to be slid.

The dustproof member 22 is manufactured, for example, by using a foaming polyethylene resin and is closely attached to the skirt plate 17 of the chute. In this manner, a closed-section space M1 is formed in the outer portion of the skirt plate 17.

Similarly with the first embodiment, on the downstream side D of the transfer section A, the /-shaped attachment bracket 13B is fixed to the reception brackets 18A of the left and right carrier stands 13, both end portions of the second top plate 25 are fitted into the attachment bracket 13B and fixed by the attachment screw, the second top plate 25 is curved in the arc shape and pulled out, and a closed-section space M2 is formed by the second glide plate 19, the carrier belt B, and the second top plate 25.

The first top plate 20 and the curtain 21 enter the lower portion of the second top plate 25 in the direct downstream side of the transfer section A. A contact member 26 is disposed between a structure including the curtain 21, the first top plate 20, and the first glide plate 18 and a structure including the second top plate 25 and the second glide plate 19, whereby the curtain 21, the first top plate 20 and the first glide plate 18 are connected to the second top plate 25 and the second glide plate 19.

In the first embodiment, the cap 17A is provided on the skirt plate 17. However, since the scattering of the dust is suppressed by the closed-section space M1, the cap 17A is not necessarily provided.

Meanwhile, in the second embodiment, the contact member 26 is provided. However, since the dust is not scattered from the boundary between the transfer section A and the downstream side by pulling the dust by the airflow upon traveling the carrier belt B, the contact member 26 is not necessarily provided.

Figure 10:
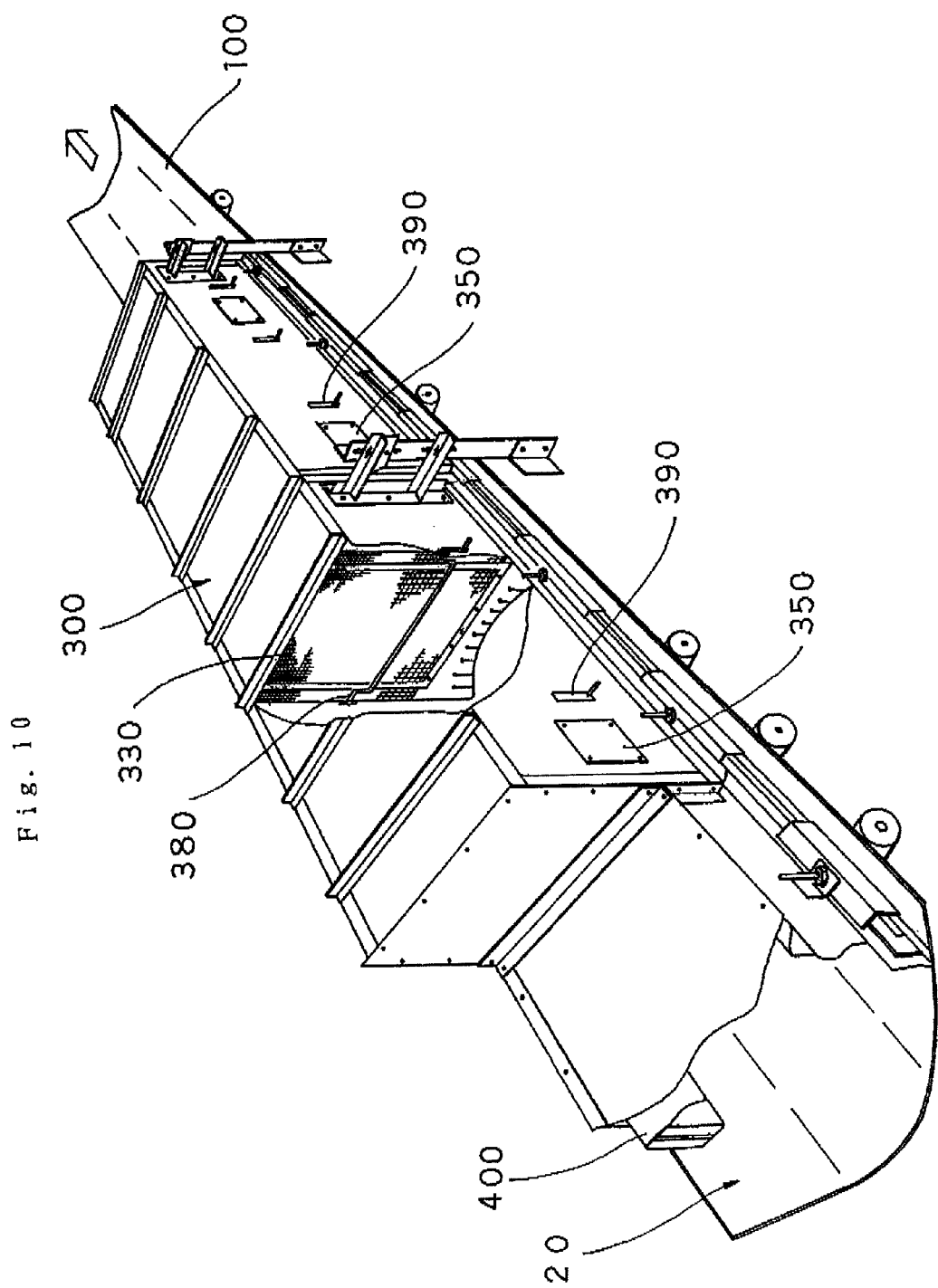
FIG. 10 is a schematic perspective view showing a dustproof apparatus of a belt conveyer according to a preferred embodiment of the present invention.
Figure 11:
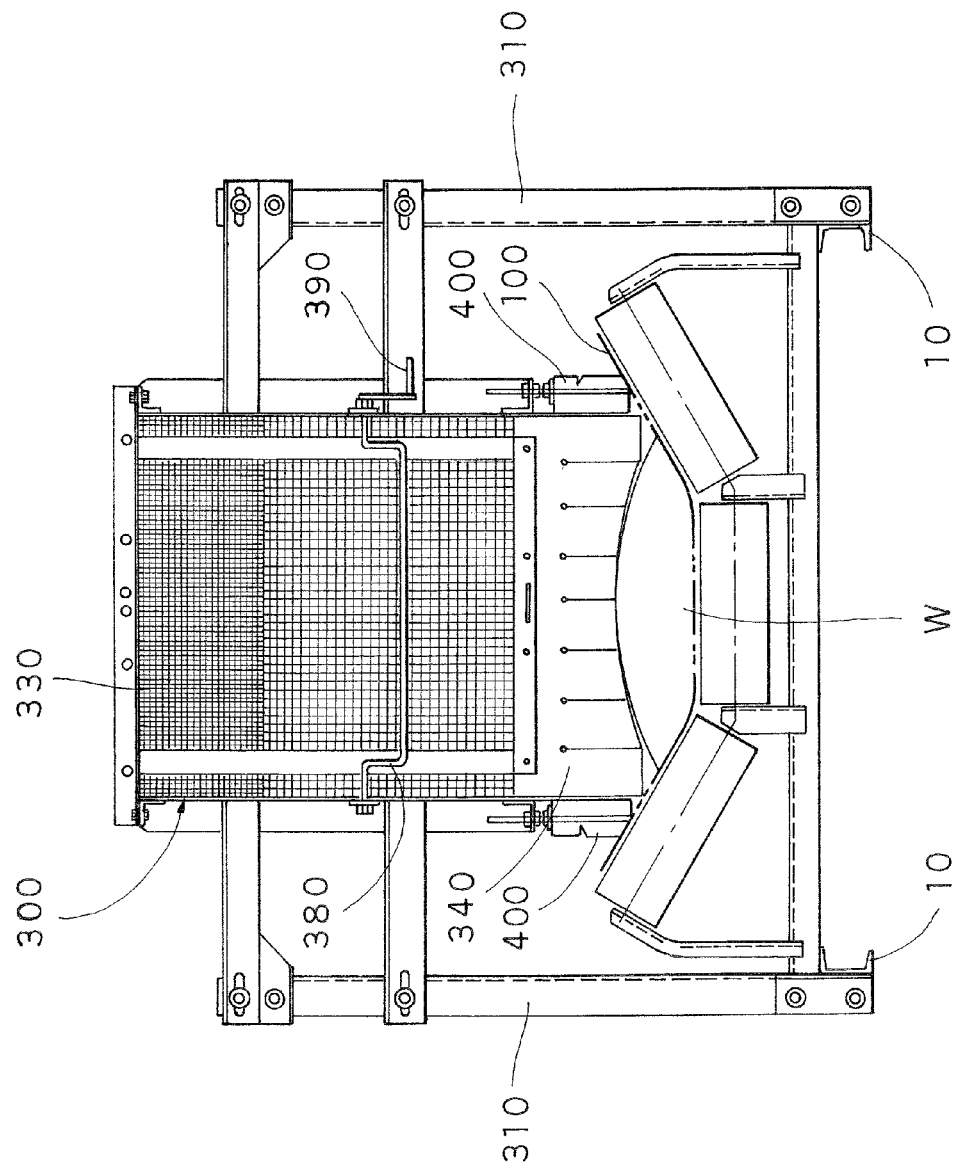
FIG. 11 is a sectional front configuration view showing the dustproof apparatus.

FIGS. 10 and 11 show a third embodiment, in which a dustproof box 300 is provided in a immediate downstream side of a connection part 200 of a belt conveyer and a downstream side of the dustproof box 300 is configured into an enclosed structure illustrated in the first and second embodiments by a top plate.

The dustproof box 300 is configured to have a shape that covers the conveyer belt 100 by left and light side plates and the top plate, and the dustproof box 300 is supported to a conveyer frame 10 by a support frame 310.

An inlet side of the dustproof box 300 is connected to an outlet of the connection part 200 and an outlet side thereof is closed by a plate. A short split curtain (not shown) made of rubber or synthetic resin is attached to a lower border of the outlet side. The dustproof box 300 has a sufficiently large sectional area so as to sufficiently decrease a flow speed of air containing dust blown off from a conveying port of the connection part 200.

A plurality of mesh plates (dust interference unit) 330 are disposed and fixed in the dustproof box 300 with a predetermined distance therebetween in a belt conveying direction so as to partition the inside of the dustproof box 300. A short split curtain 340 made of rubber or synthetic resin is attached to a lower border of each of the mesh plates 330. The mesh plates 330 are preferably configured such that meshes become gradually smaller in a belt conveying direction, and it is preferable to form the meshes of an upper half of the mesh plate to be smaller than those of a lower half thereof.

Furthermore, opposite ends of a bar member 380 is rotatably supported to both side plates of the dustproof box 300 in the vicinity of each of the mesh plates 330. A handle 390 is fixed to one end of the bar member 380 and a major part of an intermediate portion of the bar member 380 is bent into a crank shape with respect to opposite end portions thereof. By rotating the handle 390, the bar member beats the mesh plate 330 to drop the adhered dust onto a transport object W. Openable inspection windows 390 are formed in a side wall of the dustproof box 300 with appropriate intervals.

In addition, sponge skirts 400 extend at both left and right sides of the dustproof box 300 in a belt conveying direction. The sponge skirts 400 are preferably made of cross-linked polyethylene foam in view of wear resistance, water resistance and weather resistance.

When the transport object is dropped from a chute, the transport object is received by the conveyer belt 100 in the connection part 200 and conveyed to the downstream side by the conveyer belt 100. At this time, powdery materials contained in the transport object W become dust in the connection part 200 to be kicked up by the impact caused by dropping the transport object onto the connection part 200.

Furthermore, the dust kicked up in the connection part 200 is blown off from the conveying port together with air and glided into the dustproof box 300. Since a sectional area of the dustproof box 300 is sufficiently large, a flow speed of air containing the dust is remarkably decreased, and dusts having large sizes are dropped on the transport object W disposed on the conveyer belt 100 by their own weights due to decrease of the flow speed. Meanwhile, dusts having large sizes which are not dropped by their own weights first collide to a first mesh plate 330, and some of them are dropped on the transport object W disposed on the conveyer belt 100 and the remainder is adhered to the mesh plate 330.

The dusts having small sizes which have passed through the first mesh plate 330 are decreased in a flow speed, and the dusts are dropped by their own weights on the transport object W disposed on the conveyer belt 100. Meanwhile, dusts having large sizes which are not dropped by their own weight collide to a second mesh plate 330, and some of them are dropped on the transport object W disposed on the conveyer belt 100 and the remainder is adhered to the mesh plate 330.

In this manner, air containing dust is gradually decreased in a flow speed whenever the air passes through the mesh plates 330, and upon arriving at the final mesh plate 330, the air becomes like a state of being remained in the dustproof box 300 so that dusts having very small sizes are dropped by their own weight and dusts which are not dropped collide to the mesh plate 330 to be dropped or adhered to the mesh plate 330. Therefore, the air substantially not containing dusts is sent out of the dustproof box 300.

On the other hand, in cases where the clogging of the mesh plate 330 or the like is caused, an operator opens a cover of the inspection window 350 to inspect a place where the clogging is occurred and the bar member 380 can beat the mesh plate 330 by rotating the handle 390 located at the place, to get rid of the clogging.

What is claimed is:

1. A dust tight closed type belt conveyor for conveying dust contained materials to be scattered out during operation:
   which comprises;
   1) an endless conveyor belt to be driven for receiving and conveying the materials, being laid out from an upstream side provided with a transfer section to a downstream side,
   2) a supporting frame for supporting the conveyor belt from the backside thereof comprising a plurality of rollers arranged at regular intervals in a driving direction for supporting a main backside part of the conveyor belt and a plurality of glide plates arranged between the rollers in the driving direction for supporting both edges of the conveyor belt from the backside thereof in a manner that the conveyor belt is supported in a concave form,
   3) a cover roof extending in the driving direction for dust tightly closing an upside space of the conveyor belt extending in the driving direction comprising a top plate pitched so as to spread from one of the glide plates through the upside space to the other of the glide plates, whereby the conveyor belt is supported in a form of concave by a plurality of rollers, a plurality of the glide plates contacted by the both edges of the conveyor belt and the cover roof closing the upside space over the conveyor belt all make a dust tight and closed conveying space extending in the driving direction;

each supporting roller comprises horizontal center roller and a pair of half-length side slope rollers arranged at both sides of the center roller and upwardly inclined in the outside direction; and each glide plate is arranged at both sides of the conveyor belt and upwardly inclined in the outside direction with a larger oblique angle than that of side slope roller so as to make the edges of the conveyor belt bent inside for preventing meandering motion of the conveyor belt.

2. A dust tight closed type belt conveyor according to claim 1, wherein the cover roof comprises a first top plate fixed to the conveyor frame of the transfer section so as to cover a space between the conveyor frame of the transfer section and a skirt plate of the chute.

3. A dust tight closed type belt conveyor according to claim 1, wherein a pair of side slope rollers are provided at the left and right sides just in the upstream of the transfer section in a manner that the start portion of the carrier belt just coming out from the transfer section can be forced to be bent in a concave shape.

4. A dust tight closed type belt conveyor for conveying dust contained materials to be scattered out during operation: which comprises;

1) an endless conveyor belt to be driven for receiving and conveying the materials, being laid out from an upstream side provided with a transfer section to a downstream side, 2) a supporting frame for supporting the conveyor belt from the backside thereof comprising a plurality of rollers arranged at regular intervals in a driving direction for supporting a main backside part of the conveyor belt and a plurality of glide plates arranged between the rollers in the driving direction for supporting both edges of the conveyor belt from the backside thereof in a manner that the conveyor belt is supported in a concave form, 3) a cover roof extending in the driving direction for dust tightly closing an upside space of the conveyor belt extending in the driving direction comprising a top plate pitched so as to spread from one of the glide plates through the upside space to the other of the glide plates, whereby the conveyor belt is supported in a form of concave by a plurality of rollers, a plurality of the glide plates contacted by the both edges of the conveyor belt and the cover roof closing the upside space over the conveyor belt all make a dust tight and closed conveying space extending in the driving direction;

wherein the cover roof comprises a first top plate fixed to the conveyor frame of the transfer section so as to cover a space between the conveyor frame of the transfer section and a skirt plate of the chute; and the cover roof comprises a second top plate fixed to the conveyer frame on the downstream side of the transfer section so as to cover the upper portion of the carrier belt, and the first top plate overlaps with the lower portion of a start portion of the second top plate.

5. A dust tight closed type belt conveyor according to claim 4, wherein an attachment bracket is fixed to the conveyor frame for attaching the first top plate and the second top plate to the conveyor frame.

6. A dust tight closed type belt conveyor according to claim 4, wherein a pair of side slope rollers are provided at the left and right sides just in the upstream of the transfer section in a manner that the start portion of the carrier belt just coming out from the transfer section can be forced to be bent in a concave shape.

* * * * *